Patented Feb. 20, 1934

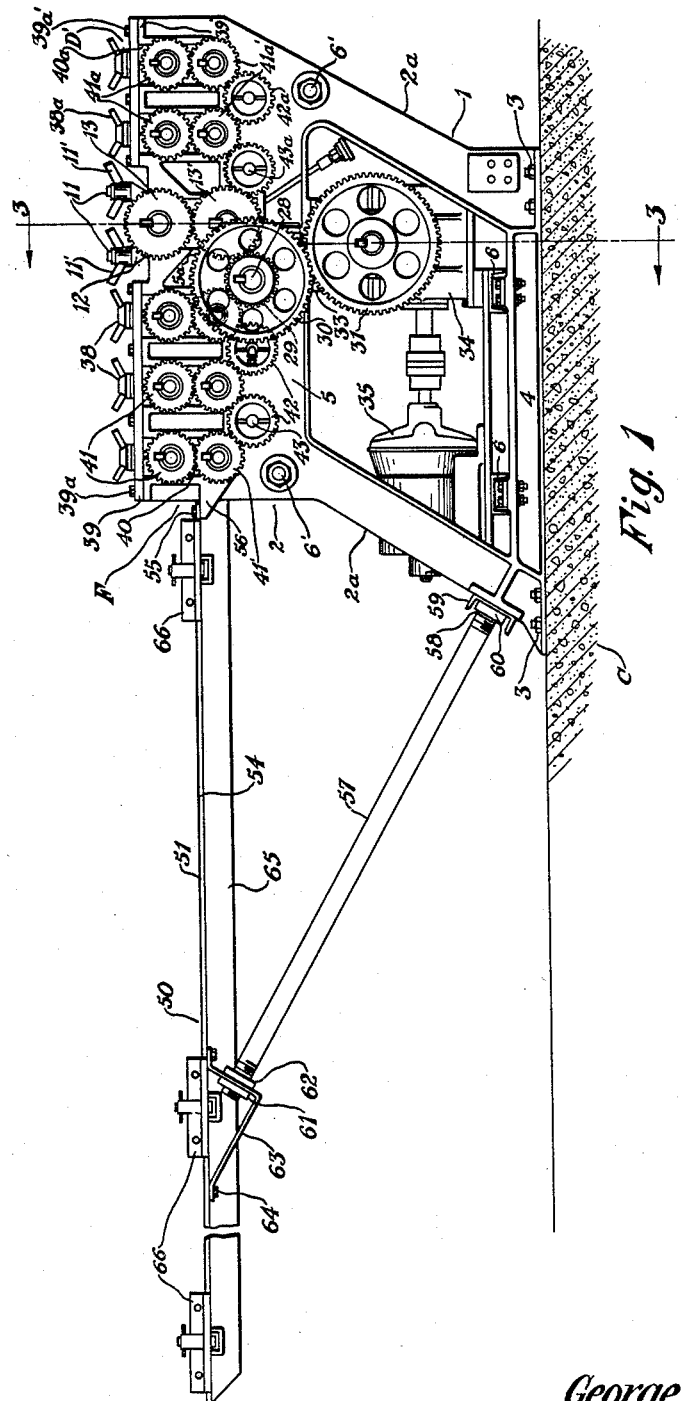

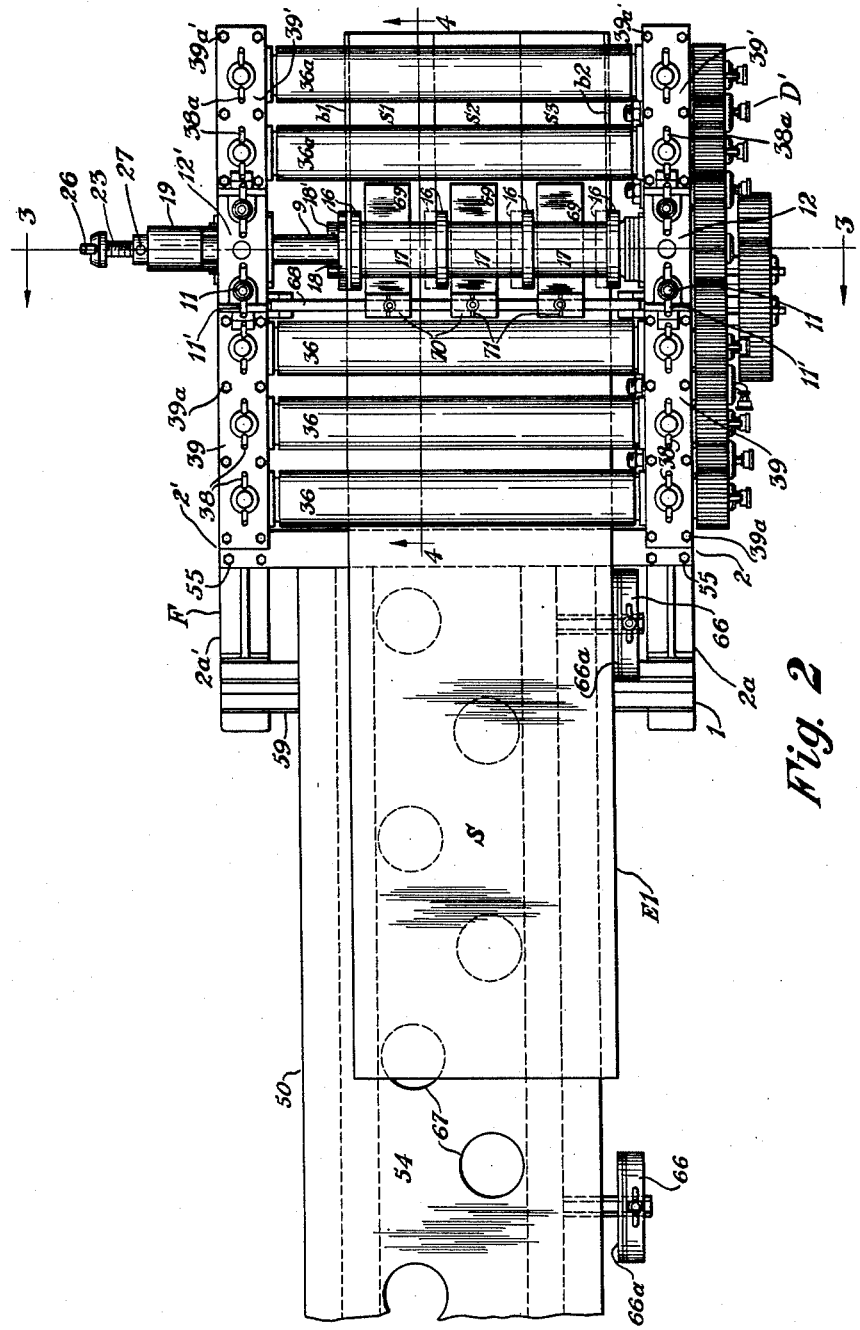

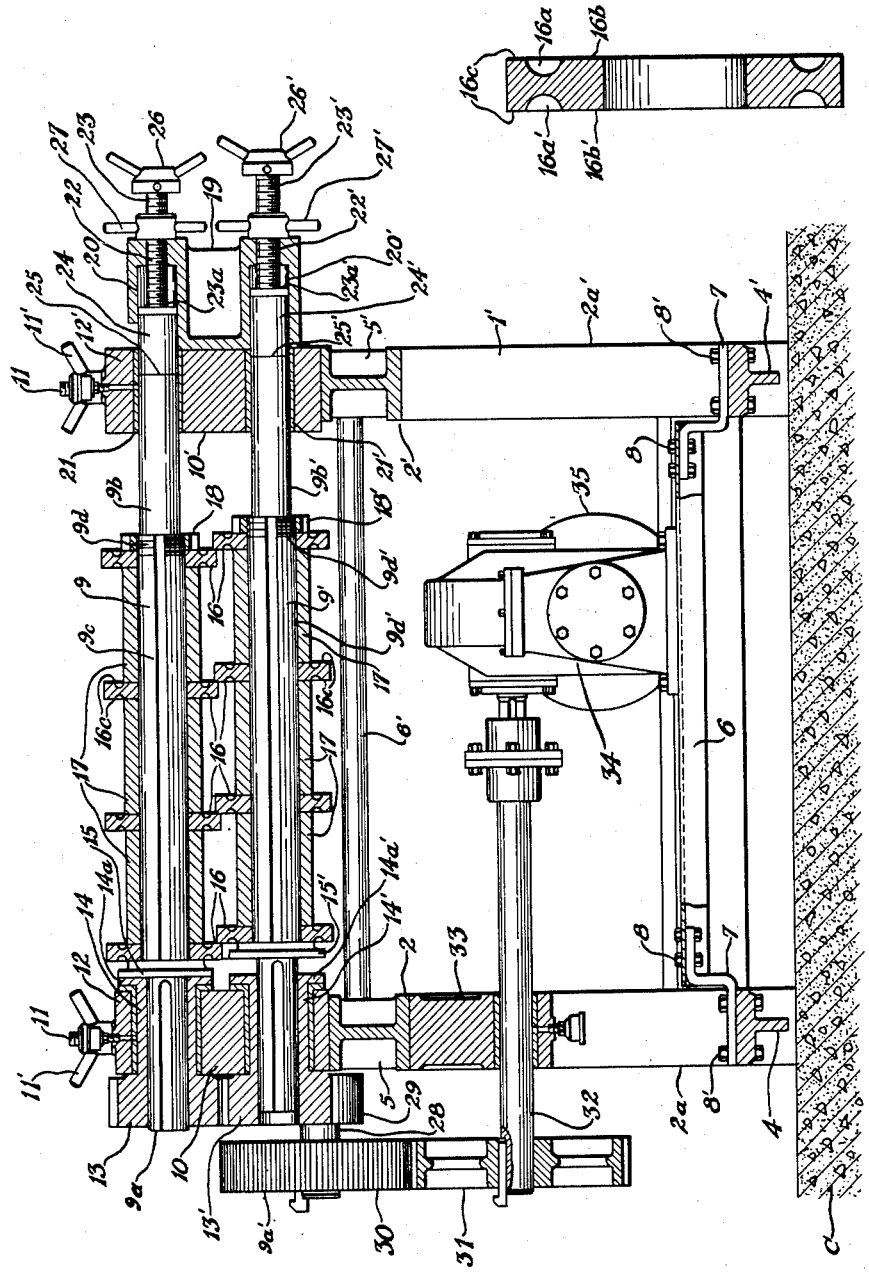

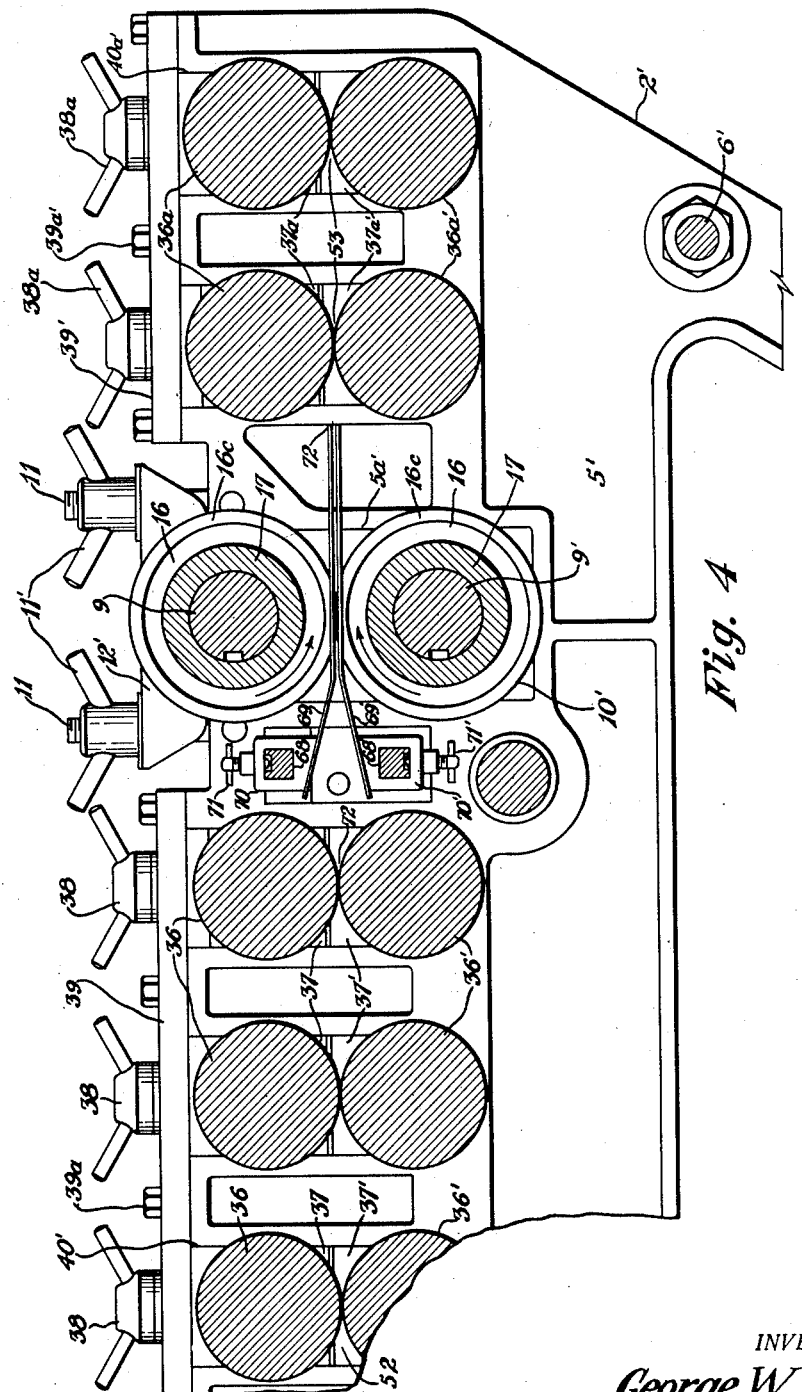

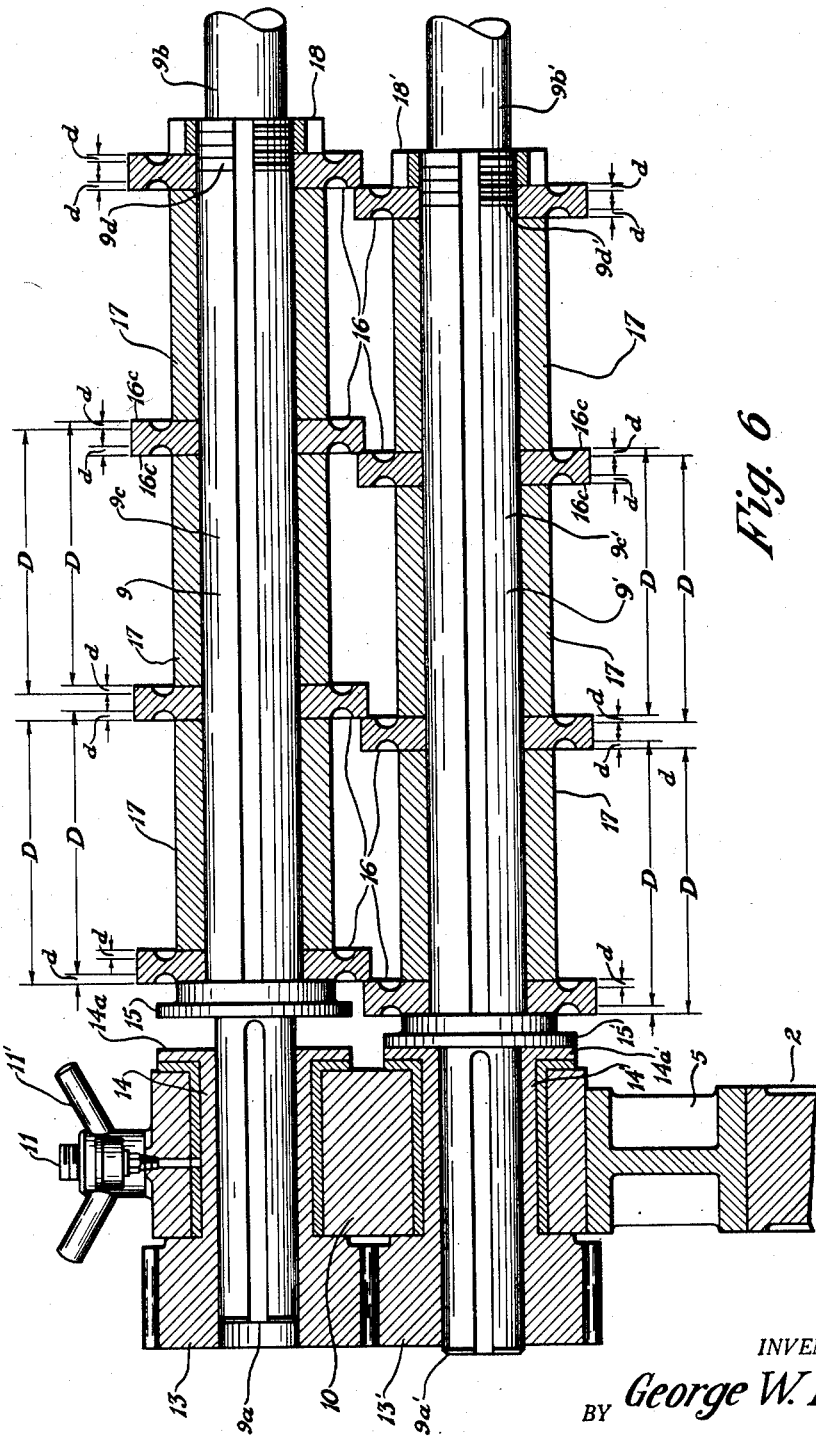

1,948,385

UNITED STATES PATENT OFFICE 1,948,385

SHEET SLITTING MACHINE

George W. Lentz, Canton, Ohio, assignor to The Bonnot Company, Canton, Ohio, a corporation of Ohio Continuation of application Serial No. 92,682, March 6, 1926. This application June 25, 1931. Serial No. 546,731

8 Claims. (Cl. 164—60)

The invention relates to machines for slitting sheets, and more particularly metal sheets into a plurality of strips of uniform width for use for example in the making of metal lath, the strips being slit preferably by shearing by the use of a plurality of rotary cutters and suitable driving, feeding and adjusting mechanism therefor; and the present invention constitutes a continuation of my prior application for Sheet slitting machines, filed March 6, 1926, Serial No. 92,682.

The objects of the present invention are to provide improvements in such mechanism by which sheets may be cut more efficiently than heretofore and which may be operated and maintained more economically than other types of sheet slitting machines.

A further object of the invention is to provide a sheet slitting machine including mechanism enabling the machine to slit buckled sheets efficiently and accurately for practical purposes.

The above and ancillary objects are attained by the use of mechanisms and arrangements hereinafter described in detail; and which in general include the use of a plurality of sets of double face rotary cutters adapted for adjustment for cutting or slitting by the action of either of the sets of faces, and adapted for rapid and economical regrinding without varying the width of strips slit thereby from a sheet, and without varying the spacing and position of the cutters on their arbors; and by the use of a plurality of sets of driven feed rolls on one side of the cutters and a plurality of sets of driven delivery rolls on the other side of the cutters for more efficiently and more accurately cutting or slitting buckled sheets.

A preferred embodiment of the invention is illustrated in the accompanying drawings, forming part hereof, in which—

Figure 1 is a side elevation of the improved sheet slitting machine;

Fig. 2, a top plan view of the same;

Fig. 3, a vertical cross section thereof as on line 3—3, Figs. 1 and 2; one set of faces of the improved double face cutters, being in operative adjustment with each other;

Fig. 4, a fragmentary vertical cross section of the same at right angles to the cross section of Fig. 3, as on line 4—4, Fig. 2;

Fig. 5, an enlarged, vertical, cross section of one of the improved double face cutters for the improved machine; and Fig. 6, an enlarged, vertical fragmentary cross section of the machine similar to the cross section of Fig. 3, the double face cutters, however, being adjusted for operation by the action of the faces opposite to the faces acting in the adjustment of Fig. 3.

Similar numerals refer to similar parts throughout the drawings.

The improved sheet slitting machine indicated generally at 1 includes a pair of spaced side frames indicated generally at 2 and 2', each having pairs of inclined legs 2a and 2a' respectively, secured to foundation C as by lag bolts 3.

Inclined legs 2a and 2a' are preferably connected with each other and reinforced at their lower ends near the foundation C as by T-bars 4 and 4'. At their upper ends the legs 2a and 2a' are connected to and support bearing block frames 5 and 5' respectively.

The frames 2 and 2', including the legs 2a and 2a', the T-bars 4 and 4' and the bearing block frames 5 and 5', are preferably made of an integral casting.

The frames 2 and 2' are spaced and maintained preferably parallel with each other as by means of a plurality of channel cross pieces 6, secured at their ends to the T-bars 4 and 4' as by means of Z-brackets 7 and bolts 8 and 8'.

The frames 2 and 2' are likewise spaced and maintained above the channel cross pieces 6 by means of a plurality of cross bolts 6' suitably associated with the frames.

Vertically spaced parallel cutter arbors 9 and 9' are journaled in bearing blocks 10 and 10', and the blocks 10 and 10' are centrally located and slidably keyed in wide, open-end slots 5a and 5a' in bearing block frames 5 and 5' and removably and adjustably supported therein as by spaced studs 11 vertically secured in the frames 5 and 5' and provided with wing nuts 11' for clamping removable bearing block clamp bars 12 and 12' upon the blocks 10 and 10'.

The ends 9a and 9a' of the arbors 9 and 9' are slidably keyed in meshed gears 13 and 13' having flanged journal extensions 14 and 14' removably secured and supported in the centrally located journal block 10 of the frame 5.

Arbor 9 is provided with a rigidly secured preferably integral spacing and abutment collar 15 for abutment, as illustrated in Figs. 3 and 6, with the flange 14a of the journal 14 of the gear 13.

One rigid rotary cutter 16 is slidably keyed upon the arbor 9 and abuts the spacing collar 15, and a plurality of like rigid rotary cutters 16 are slidably keyed upon the arbor 9 and spaced from the first cutter 16 and from each other by a plurality of rigid sleeves 17 having desired axial lengths.

The end 9b of the arbor 9 journaled in the frame 5' is preferably of less diameter than its central portion 9c upon which the cutters 16 and sleeves 17 are strung.

The central portion 9c of the arbor 9 is provided with threads 9d for a suitable distance from the junction of the portion 9c with the portion 9b, and a nut 18 is screwed upon the threads 9d for clamping the cutters 16 and the sleeves 17 against the collar 15.

Arbor 9' is provided with a rigidly secured preferably integral spacing and abutment collar 15' for abutment with the flange 14a' of the journal 14 of the gear 13'.

In a manner described for the arbor 9, one rigid rotary cutter 16 is slidably keyed upon the arbor 9' and abuts the spacing collar 15'; and a plurality of like rigid rotary cutters 16 are slidably keyed upon the arbor 9' and spaced from the first cutter 16 and from each other by a plurality of rigid sleeves 17.

The end 9b' of the arbor 9' journaled in the frame 5' is preferably of less diameter than its central portion 9c' upon which the cutters 16 and sleeves 17 are strung.

The central portion 9c' of the arbor 9' is provided with threads 9d' for a suitable distance from the junction of the portion 9c' with the portion 9b', and a nut 18' is screwed upon the threads 9d' for clamping the cutters 16 and the sleeves 17 against the collar 15'.

In other words, by the above described construction, both arbor 9 and arbor 9' have keyed and strung thereon a plurality of like cutters 16 spaced by like sleeves 17; and clamped by collars 15 and nut 18, and by collar 15' and nut 18', upon the arbors 9 and 9', respectively.

A thrust bracket 19 is secured upon the outside of the frame 5' and provided with apertures 20 and 20' in alignment with the apertures 21 and 21' of the block 10' in which the arbors 9 and 9' are journaled, and the bracket 19 is also provided with threaded apertures 22 and 22' axial with apertures 20 and 20', and in which threaded apertures, screws 23 and 23' are rotatably mounted and have their inner ends 23a and 23a' rotatably secured to plugs 24 and 24' having the same diameter as the arbor ends 9b and 9b', and abutting said ends at 25 and 25' respectively.

The screws 23 and 23' are provided at their outer ends with capstan handles 26 and 26' respectively and have mounted thereon capstan lock nuts 27 and 27' respectively.

The frame 5 also carries a shaft 28 and upon its inner end near the frame 5 is keyed a gear 29 in mesh with the gear 13' of shaft 9', and at the outer end of the shaft 28, a gear wheel 30 is keyed and is meshed with a gear wheel 31 keyed upon a shaft 32 suitably journaled in a bracket 33 depending from the frame 5, said shaft being suitably connected to a housed worm reduction unit 34 which is connected in a usual fashion with a motor 35, and the motor being suitably connected with a source of power.

For feeding a sheet to be slit to the rotary cutters, at the feed side of the rotary cutters indicated generally at F, a plurality of sets of feed rolls are removably journaled in the frames 5 and 5', each set of feed rolls including an upper roll 36 and a lower roll 36' journaled respectively in removable journal blocks 37 and 37'; which blocks are removably secured in frames 5 and 5' as by means of capstan bolts 38 screwed into removable reaction bars 39 secured to the frames as by studs 39a. The blocks 37 and 37' are removably and slidably keyed in wide, open-end slots 40 and 40' in the frames 5 and 5' respectively.

Upon extensions of the feed roll journals projecting beyond the frame 5, each set of feed rolls 36 and 36' is geared to each other by means of pinions 41 and 41', and the several pinions 41' are geared to each other by pinions 42, suitably journaled upon stub shafts 43 secured to the frame; and the pinion 41' located nearest the gear 29 is meshed with gear 29.

For delivering slit strips from the rotary cutters at the delivery side of the machine indicated generally at D', a plurality of sets of delivery rolls are removably journaled in the frames 5 and 5', each set of delivery rolls including an upper roll 36a and a lower roll 36a' journaled respectively in removable journal blocks 37a and 37a', which blocks are removably secured in frames 5 and 5' as by means of capstan bolts 38a screwed into removable reaction bars 39' secured to the frames as by studs 39a. The blocks 37a and 37a' are removably and slidably keyed in wide, open-end slots 40a and 40a' in frames 5 and 5' respectively.

Upon extensions of the delivery roll journals projecting beyond the frame 5, each set of delivery rolls 36a and 36a' is geared to each other by means of pinions 41a and 41a', and the several pinions 41a' are geared to each other by pinions 42a, suitably journaled upon stub shafts 43a secured to the frame; and one of the pinions 42a is meshed with the gear 13', which is itself meshed with the driving gear 29.

At the feed side of the machine a feed table indicated generally at 50 is secured. The top of the feed table 51, and the nips 52 and 53 of the feed and delivery rolls are preferably all in the same plane, and the axes of the cutter shafts 9 and 9' are preferably located at equal distances from this plane.

The feed table indicated generally at 50, includes a top plate 54 secured at its inner end as by cap screws 55, to brackets 56 extending from the feed ends of the frames 5 and 5', and the top plate is braced by diagonal struts 57 provided with adjustable nuts 58 at their lower ends for adjustable abutment with a cross channel 59 secured to the feed side legs 2a and 2a' as by cap screws 60, the struts 57 being adjustably connected at their upper ends with the plate 54 as by means of adjustable tension and compression nuts 61 and 62 and angle brackets 63 secured at their leg ends to the table as by cap screws 64. The table top plate 54 is also provided with a plurality of longitudinal angle reinforcements 65.

For providing guides for a sheet delivered to the feed rolls, a plurality of guide blocks 66 are adjustably secured at one side of the feed table, and the blocks have faces 66a aligned so as to bring one edge E1 of a sheet abutted thereagainst into proper alignment with the cutters 16. Table top 54 is provided with a plurality of apertures 67 for lightening the table top.

Upon a plurality of cross bars 68 and 68', preferably located between the last set of feed rolls and the cutters, and secured at their ends to the frames 5 and 5', a plurality of angled baffle guides 69 and 69' are adjustably mounted at their ends nearest the feed rolls as by means of collars 70 and 70' secured to the baffle guides and slidably mounted upon the cross bars 68 and 68', the collars being each provided with set screws 71 and 71' for locking the same upon the cross bars.

The baffle guides extend between the spaced cutters and sleeves to a desired location as at 72, adjacent to the delivery rolls, for guiding the strips slit from sheets by the cutters 16 until the strips reach the first set of delivery rolls adjacent to the cutters.

As best illustrated in Fig. 5, each of the improved cutters 16 is preferably a relatively thick circular disk made preferably of tool steel, and finished all over and provided with peripheral grooves 16a and 16a' on each of the circular faces 16b and 16b' forming cutting bands 16c on each face of the cutter, both cutting bands being ground for sharpening.

When the machine is set up as illustrated in Fig. 3, the plurality of rigid cutters 16 and equal length rigid spacing sleeves 17 are strung upon the arbor 9 and clamped thereon as by the nut 18 screwed up against the reaction of the collar 15.

Collar 15 is further abutted against the flange 14a of the journal 14 by means of a desired thrust applied by screwing up the capstan screw 23.

Loosely positioned prior to the above described adjustment of the arbor 9, as viewed on Fig. 3, the left cutting bands 16c of the cutters 16 strung upon arbor 9' and clamped thereon as by means of screw 18' and reaction collar 15', abut the right cutting band 16c of the cutters 16 upon the upper arbor 9. A desired positive thrust of the left cutting bands of the cutters 16c upon the arbor 9' against the right cutting bands 16c of the cutter 16 upon the arbor 9, may be attained by manipulation of the screw 23'.

When the cutters are properly adjusted, capstan lock nuts 27 and 27' may be tightened to positively lock the adjustment during the operation of the machine.

In operation, the motor is started and the feed rolls, cutters, and delivery rolls are caused to rotate through the driving mechanism heretofore described. A sheet S having a side edge E1 abutting the guides 66, is pushed from the feed table into the nip of the first set of feed rolls and propelled thereby and each successive set of feed rolls to the sets of rotary cutters having their cutting bands sides reacting against each other as aforesaid with positive means for adjusting and maintaining the adjusted shearing pressure between the side reacting abutting cutters; whence said cutters slit, as shown in Fig. 2, three strips s1, s2 and s3, of uniform width, and outer longitudinal scrap edge bands b1 and b2 from the sheet S, which strips are guided by the baffle guides 69 into the first set of delivery rolls and, together with the bands are propelled thereby to the second set, whence the plurality of sets of feed rolls, the thrust cutters, and the plurality of sets of delivery rolls draw the sheet through the machine in a straight line without lateral waving or twisting from side to side, and deliver accurately slit strips from the machine, and these strips, due to the outward inclination of the delivery end legs 2a and 2a', fall directly to the floor and clear the machine.

Other types of slitting machine not provided with a plurality of sets of feed or delivery rolls, often permit a lateral waving or twisting of a sheet passing therethrough, so that the tail of a sheet passing through such hitherto known types of slitting machines may depart from a straight axial line.

The magnitude of the lateral waving or twisting of a sheet passing through hitherto known types of slitting machines, is materially amplified if the sheet happens to be buckled; that is to say, if the sheet's surface departs at one or more points from a plane when the sheet is resting upon a level surface.

The present improved slitting machine being provided with a plurality of feed and delivery rolls, grips sheets passing therethrough in a plurality of places, so that lateral waving or twisting of sheets is prevented, and so that buckled sheets may be slit by the improved machine with substantially the same useful results as if said buckled sheets were perfectly formed.

Among the many uses for the improved machine is the slitting of strips from sheets for providing a supply of strips for expanded metal lath machines.

When the machine is set up as illustrated in Fig. 3, the continuous slitting operations may be carried on for a large number of sheets.

While it is true that the abutting cutting bands of the cutters have a tendency to sharpen each other, after a certain number of sheets have passed through the machine as set up in Fig. 3, it is desirable to adjust the arrangement of the cutting bands to the position illustrated in Fig. 6, wherein the left cutting bands of the cutters on arbor 9 thrust against the right cutting bands on arbor 9', after which adjustment the machine may again be operated for slitting a great number of sheets.

This change of acting cutting bands is quickly made by loosening capstan nuts 11 and by raising arbor 9 sufficiently to enable arbor 9' to be slid over in the position shown in Fig. 6, after which arbor 9 may be adjusted and the machine made ready for operation by tightening and adjusting the various capstan screws and lock nuts as heretofore described.

After both sets of cutting bands have become dull, both arbors are removed from the machine and without removing the cutters from the arbors, the cutting bands of each cutter are ground down equal distances $d$ as indicated in Fig. 6, so that the distance D between like positioned bands on successive spaced cutters remains constant after the grinding or sharpening operation, whereby the width of strips slit from sheets by a given arrangement of cutters and sleeves on the arbor remains constant before and after grinding, by the above method of grinding or sharpening the cutters.

I claim:

1. A metal sheet slitting machine including rotary means for longitudinally shearing the sheet, a plurality of sets of rolls for feeding the sheet to the shearing means, said rolls holding the sheet from lateral twisting movement, a plurality of sets of rolls for withdrawing the slit sheet from the shearing means, said rolls holding the sheet from lateral twisting movement, and means holding the shearing means from lateral movement.

2. A metal sheet slitting machine including means for slitting a plurality of strips from a sheet, and a plurality of sets of feed rolls for feeding the sheet to the slitting means, and the slitting means including two shafts, a plurality of side reacting rigid rotary shearing cutters on each shaft, rigid spacing means for the cutters, one side of each cutter being in lateral shearing abutment with an opposite side of a cutter on the other shaft, and the reacting sides of the cutters on each shaft being similarly located, positive means for maintaining one of the shafts immovable in the direction of its axis of rotation, and positive means acting on the other shaft and maintaining shearing pressure between the laterally abutting cutters.

3. A metal sheet slitting machine including means for slitting a plurality of strips from a sheet, and a plurality of sets of delivery rolls for delivering strips from the slitting means, and the slitting means including two shafts, a plurality of side reacting rigid rotary shearing cutters on each shaft, rigid spacing means for the cutters, one side of each cutter being in lateral shearing abutment with an opposite side of a cutter on the other shaft, and the reacting sides of the cutters on each shaft being similarly located, positive means for maintaining one of the shafts immovable in the direction of its axis of rotation, and positive means acting on the other shaft and maintaining shearing pressure between the laterally abutting cutters.

4. A metal sheet slitting machine including means for slitting a plurality of strips from a sheet, a plurality of sets of feed rolls for feeding the sheet to the slitting means, and a plurality of sets of delivery rolls for delivering strips from the slitting means, and the slitting means including two shafts, a plurality of side reacting rigid rotary shearing cutters on each shaft, rigid spacing means for the cutters, one side of each cutter being in lateral shearing abutment with an opposite side of a cutter on the other shaft, and the reacting sides of the cutters on each shaft being similarly located, positive means for maintaining one of the shafts immovable in the direction of its axis of rotation, and positive means acting on the other shaft and maintaining shearing pressure between the laterally abutting cutters.

5. A metal sheet slitting machine including sheet feeding means and slitting means, the slitting means including two shafts, rigid spacing means for the cutters, a side reacting rigid rotary shearing cutter on each shaft, one side of each cutter being in lateral shearing abutment with an opposite side of the cutter on the other shaft, thrust means maintaining one of the shafts immovable in one direction longitudinally of its axis of rotation, and means opposed to the thrust means and applying positive pressure on the other shaft in the direction of its axis of rotation whereby shearing pressure is maintained between the lateral abutting cutters and whereby the cutters are maintained against lateral movement.

6. A metal sheet slitting machine including means for slitting a plurality of strips from a sheet, and a plurality of sets of feed rolls for feeding the sheet to the slitting means, and the slitting means including two shafts, a plurality of side reacting rigid rotary shearing cutters on each shaft, rigid spacing means for the cutters, one side of each cutter being in lateral shearing abutment with an opposite side of a cutter on the other shaft, and the reacting sides of the cutters on each shaft being similarly located, and adjustable positive means for maintaining each shaft immovable in the direction of its axis of rotation, whereby an adjusted shearing pressure is maintained between the laterally abutting cutters and whereby the cutters are maintained against lateral movement.

7. A metal sheet slitting machine including means for slitting a plurality of strips from a sheet, and a plurality of sets of delivery rolls for delivering strips from the slitting means, and the slitting means including two shafts, a plurality of side reacting rigid rotary shearing cutters on each shaft, rigid spacing means for the cutters, one side of each cutter being in lateral shearing abutment with an opposite side of a cutter on the other shaft, and the reacting sides of the cutters on each shaft being similarly located, and adjustable positive means for maintaining each shaft immovable in the direction of its axis of rotation, whereby an adjusted shearing pressure is maintained between the laterally abutting cutters and whereby the cutters are maintained against lateral movement.

8. A metal sheet slitting machine including means for slitting a plurality of strips from a sheet, a plurality of sets of feed rolls for feeding the sheet to the slitting means, and a plurality of sets of delivery rolls for delivering strips from the slitting means, and the slitting means including two shafts, a plurality of side reacting rigid rotary shearing cutters on each shaft, rigid spacing means for the cutters, one side of each cutter being in lateral shearing abutment with an opposite side of a cutter on the other shaft, and the reacting sides of the cutters on each shaft being similarly located, and adjustable positive means for maintaining each shaft immovable in the direction of its axis of rotation, whereby an adjusted shearing pressure is maintained between the laterally abutting cutters and whereby the cutters are maintained against lateral movement.

GEORGE W. LENTZ.